United States Patent [19]

Vick

[11] Patent Number: 5,060,964
[45] Date of Patent: Oct. 29, 1991

[54] FIFTH WHEEL

[76] Inventor: Henry L. Vick, 24-7 Westchester Ct., Birmingham, Ala. 35215

[21] Appl. No.: 380,880

[22] Filed: Jul. 17, 1989

[51] Int. Cl.[5] .............................................. B60D 1/64
[52] U.S. Cl. .................................... 280/421; 280/422; 280/441.1
[58] Field of Search ............... 280/420, 421, 422, 433, 280/438.1, 441.1

[56] References Cited

U.S. PATENT DOCUMENTS

| 2,494,982 | 1/1950 | Apgar | 280/441.1 |
| 2,670,220 | 2/1954 | Colpo | 280/441.1 |
| 2,888,275 | 5/1959 | Hill | 280/420 |
| 3,653,686 | 4/1972 | Roesies | 280/421 |
| 3,719,372 | 3/1973 | Rawlings | 280/421 |
| 3,751,070 | 8/1973 | Schaffart et al. | 280/441.1 X |

Primary Examiner—Charles A. Marmor
Assistant Examiner—Mitchell Bompey
Attorney, Agent, or Firm—Jennings, Carter, Thompson & Veal

[57] ABSTRACT

An improved fifth wheel incorporates a junction fitting for pneumatic, hydraulic and electrical control lines which mates the truck to the tractor simultaneously with the connection performed by the fifth wheel. The deck plate is pivoted about a vertical axis to maintain the connection and facilitate turning of the rig.

13 Claims, 3 Drawing Sheets

Fig. 3
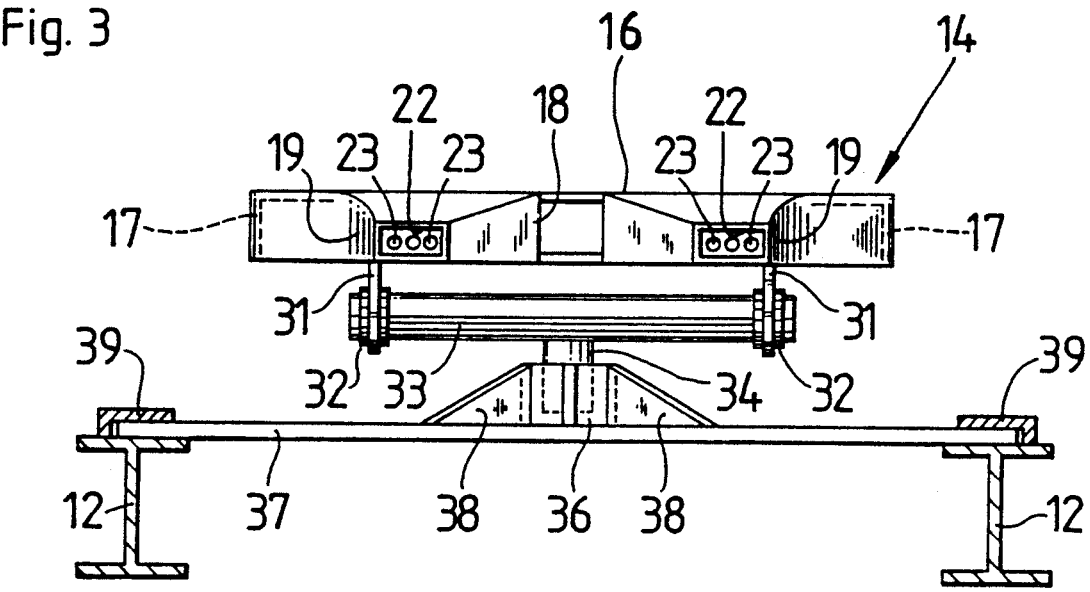
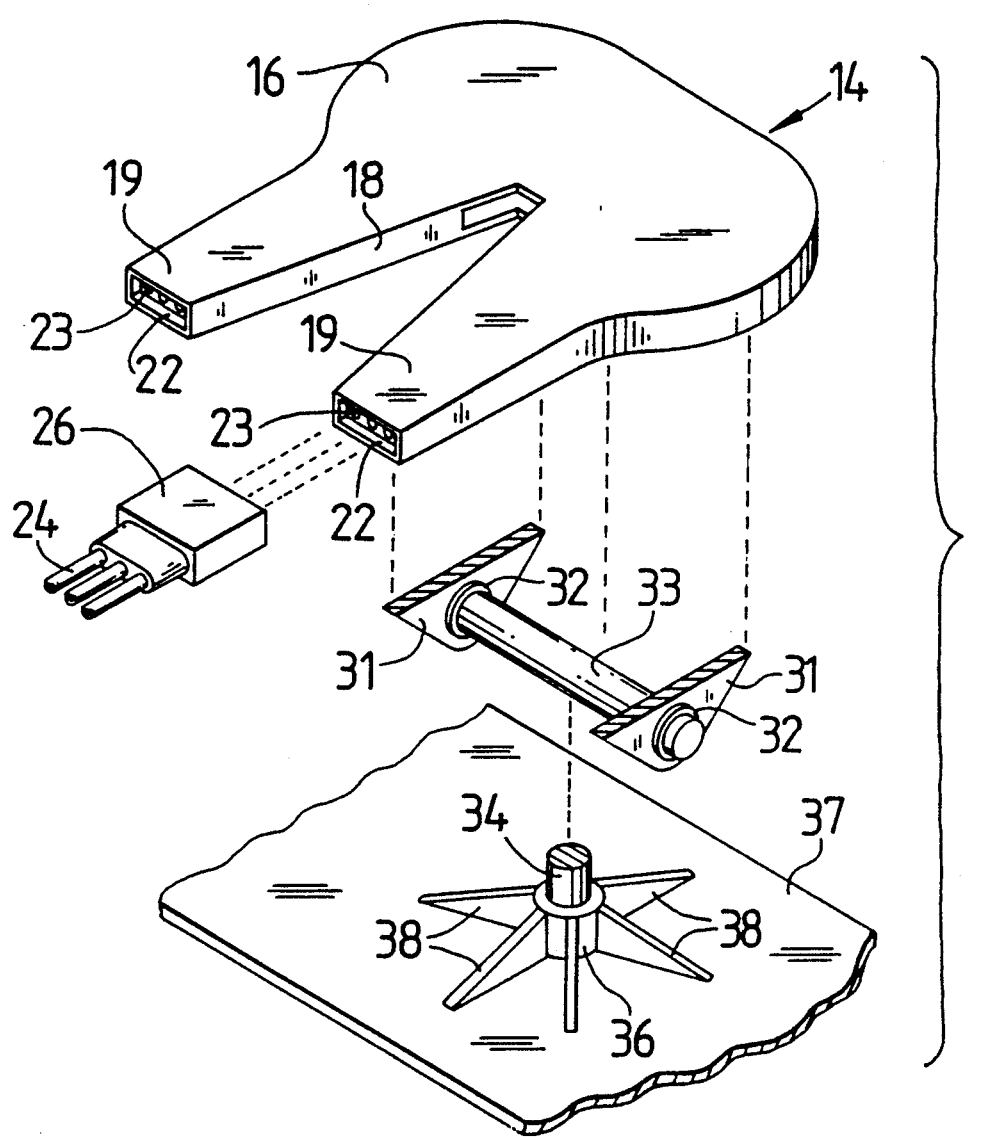
Fig. 4

FIFTH WHEEL

FIELD OF THE INVENTION

The present invention relates to connective devices commonly known as fifth wheels, which are used to connect tractor-trailer rigs. More particularly the present invention relates to improvements in a fifth wheel which allow automatic and secure connection of the control lines between the tractor and trailer and which reduce tire wear by facilitating the pivotal motion about the kingpin.

BACKGROUND OF THE INVENTION

Numerous examples of fifth wheels may be found in the patent literature. Essentially the fifth wheel is a device which locks about a kingpin depending from a trailer and supports the forward end of the trailer for towing by a tractor. The fifth wheel may be tiltable about an axis transverse to the length of the trailer and may be mounted on a longitudinal slide on the tractor. However, no known fifth wheel assemblies are movable about a vertical axis; therefore there is a frictional interface between the deck plate of the fifth wheel and the undersurface of the trailer. Accordingly, this frictional interface can occasionally result in a resistance to turning which causes the wheels of the tractor to wear out more rapidly. Also associated with the connection of the tractor to the trailer is the use of what are called pigtails. Pigtails are the flexible connector units which connect the hydraulic, pneumatic or electrical systems of the tractor to the trailer. Current practice requires the operator to manually locate the pigtails and properly connect them. This requires the driver to get out of the tractor and perhaps climb onto the deck or beneath the trailer to locate the pigtails and make the connection. Conventional fifth wheel areas are quite greasy and considerable road grime accumulates in the area, thus securing the pigtails is a somewhat unpleasant task.

SUMMARY OF THE INVENTION

It is an object of the present invention to provide automatic connection between the tractor and trailer control systems concomitant with engagement of the fifth wheel and kingpin.

Yet another object of the invention is to improve the handling characteristics of a tractor-trailer rig.

Still another object of the invention is to relieve the driver of the necessity of leaving the cab to connect the control lines.

Yet another object of the invention is to reduce the amount of grease used on fifth wheels and thereafter deposited on the highways.

These and other objects, advantages, and features of my invention are advantageously accomplished in my combination of elements in an improved fifth wheel.

The typical fifth wheel includes a deck plate having a downturned peripheral flange and a rearwardly opening slot which tapers from the periphery of the deck plate inwardly. The slot guides the kingpin into locking engagement in a manner well known in the art and which is not germane to my invention. In my invention the portion of the deck plate adjacent the slot is elongated and houses a recessed set of connector elements. These connector elements are the female halves of connectors such as would be used in pigtails. That is to say, they are so-called quick release connectors. The other half of the connectors, i.e. the male halves, are mounted on the underside of the trailer in fixed relation to the kingpin such that as the kingpin is guided into engagement, the connectors are urged into engagement. The deck plate is supported on a bearing member which permits rotation of the deck plate about a vertical axis, thus the deck plate can pivot beneath the trailer to maintain the relative position of the connector elements to each other and to facilitate turning of the rig.

The foregoing and other features of my invention are more clearly disclosed in the appended drawings and the description of the preferred embodiments contained hereinafter.

BRIEF DESCRIPTION OF THE DRAWINGS

Apparatus utilizing features of my invention are depicted in the accompanying drawings which form a portion of this disclosure and wherein:

FIG. 3 is a rear elevational view of the fifth wheel;

FIG. 4 is an exploded perspective view of the apparatus;

DESCRIPTION OF THE PREFERRED EMBODIMENTS

Figure 1:
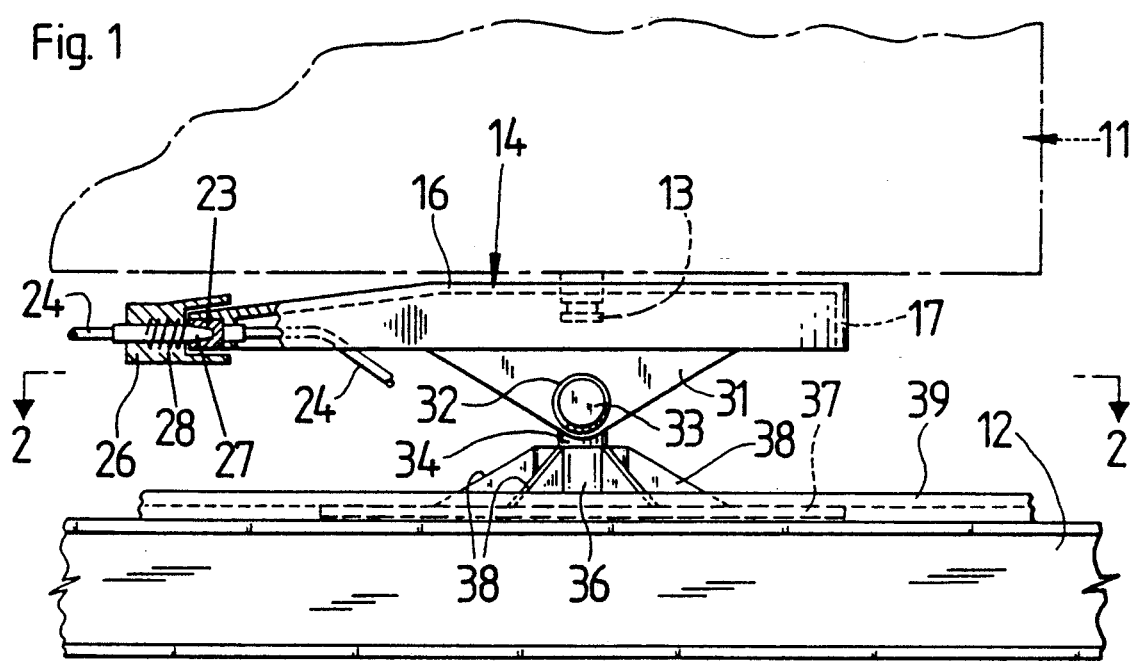
FIG. 1 is a partial side elevational view of my apparatus as used to connect a tractor to a trailer.
Figure 2:
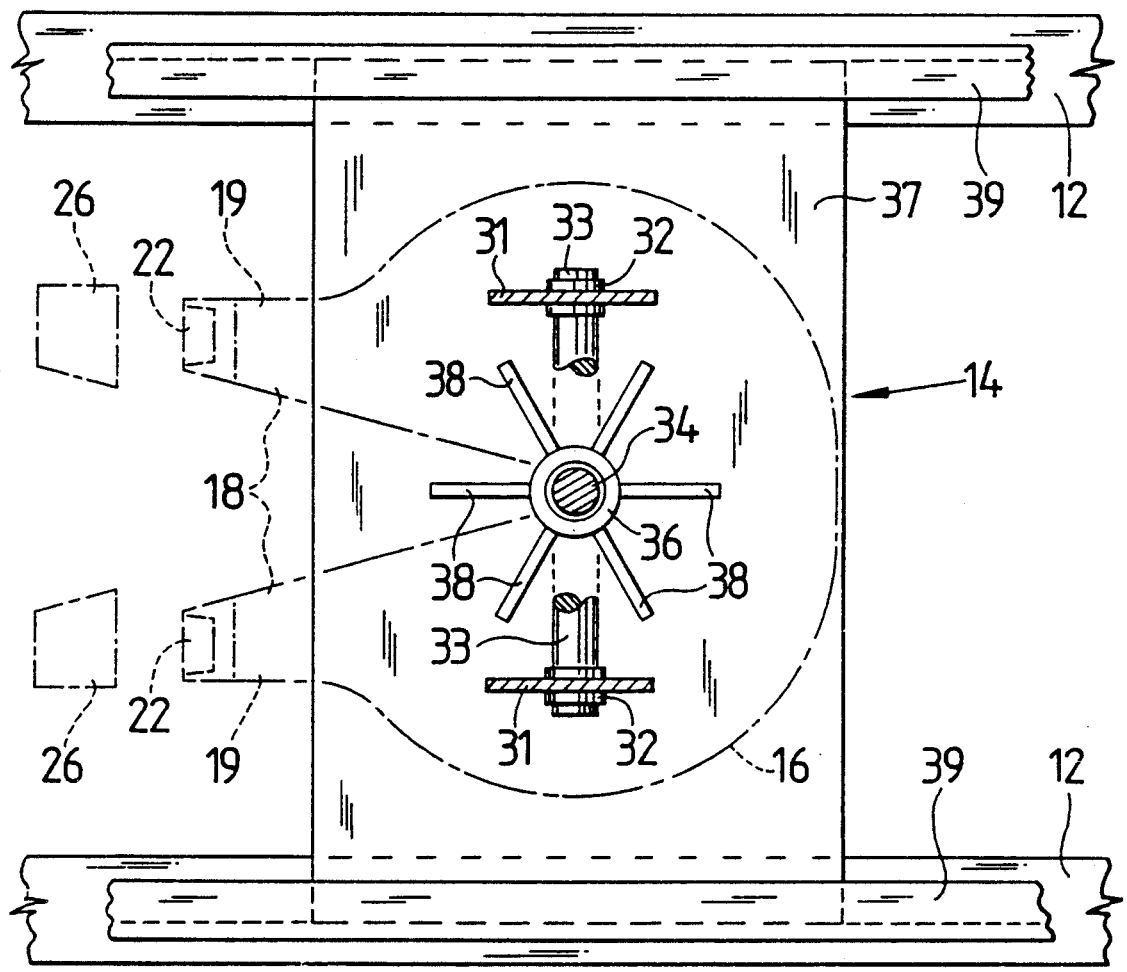
FIG. 2 is a sectional view taken along line 2—2 of FIG. 1.

A clearer understanding of my invention may be obtained by a study of the accompanying drawings in conjunction with the following description. As may be seen in FIG. 1, my invention is an improvement to a fifth wheel used to connect a trailer 11 to a tractor, partially shown by the frame member at 12. As is well understood in the art, a kingpin 13 carried by the trailer 11 is engaged within a set of securing jaws which are not illustrated. The fifth wheel 14 includes a deck plate 16 having a peripheral downturned flange 17. The deck plate 16 has a tapered slot 18 which receives the kingpin and guides it to the jaws at the center of the fifth wheel, with the deck plate 16 forming a pair of tabs on either side of the slot.

In my invention the tabs are formed integrally with the deck plate as extension members 19 which extend rearwardly a distance greater than on conventional fifth wheels. The extension member 19 terminates in a receptacle 21, which has a beveled inner surface 22 extending from the rearmost portion of the extension member 19 to a set of connector elements 23, which are the female sides of a coupling such as quick release coupling for the hydraulic, pneumatic, or electrical lines 24 connecting the trailer to the tractor. Mounted to the trailer 11 and protected within a forwardly opening housing 26 are a corresponding set of male connecting elements 27. The male connecting elements 27 are carried on the trailer 11 rearwardly of the kingpin 13 at a distance which will prevent contact with the tabs of a conventional fifth wheel, but which will place the elements 23 and 27 in a coupled engagement when the kingpin seats within the slot 10. The male elements 27 are preferably spring loaded as at 28 to allow them to properly engage female elements 23 within a reasonable tolerance. Housing 27 also acts as a guide by receiving the extension members 19 therewithin.

The deck plate 16 is supported on a bearing structure which allows it to turn, thus when the connectors are intact the deck plate turns with the trailer 11 rather than the trailer 11 turning on the deck plate. As shown in FIGS. 1–4, the deck plate 16 is supported on a set of gussets 31 which are in turn secured to a set of greaseless bearings 32 at each end of a crossbar 33 which is about twelve inches long and is supported at its center on a vertical stub shaft 34. Stub shaft 34 is free to rotate about its vertical axis in a bearing cage 36 on a thrust bearing or the like. The bearing cage 36 is welded or otherwise secured to a slide plate 37 by a plurality of strengthening gussets 38. The slide plate 37 is secured laterally within a set of slide guides 39 which allow the slide plate 37 to be selectively positioned along and above the frame of the tractor 12 as is well known in the art.

Figure 5:
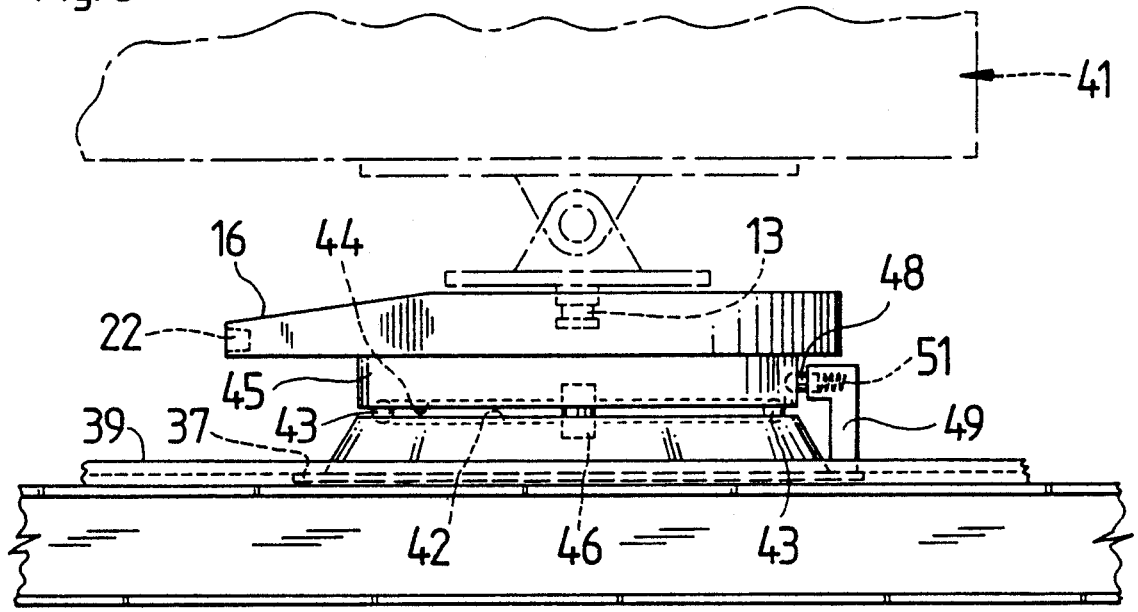
FIG. 5 is a partial side elevational view of a second embodiment of the invention.
Figure 6:
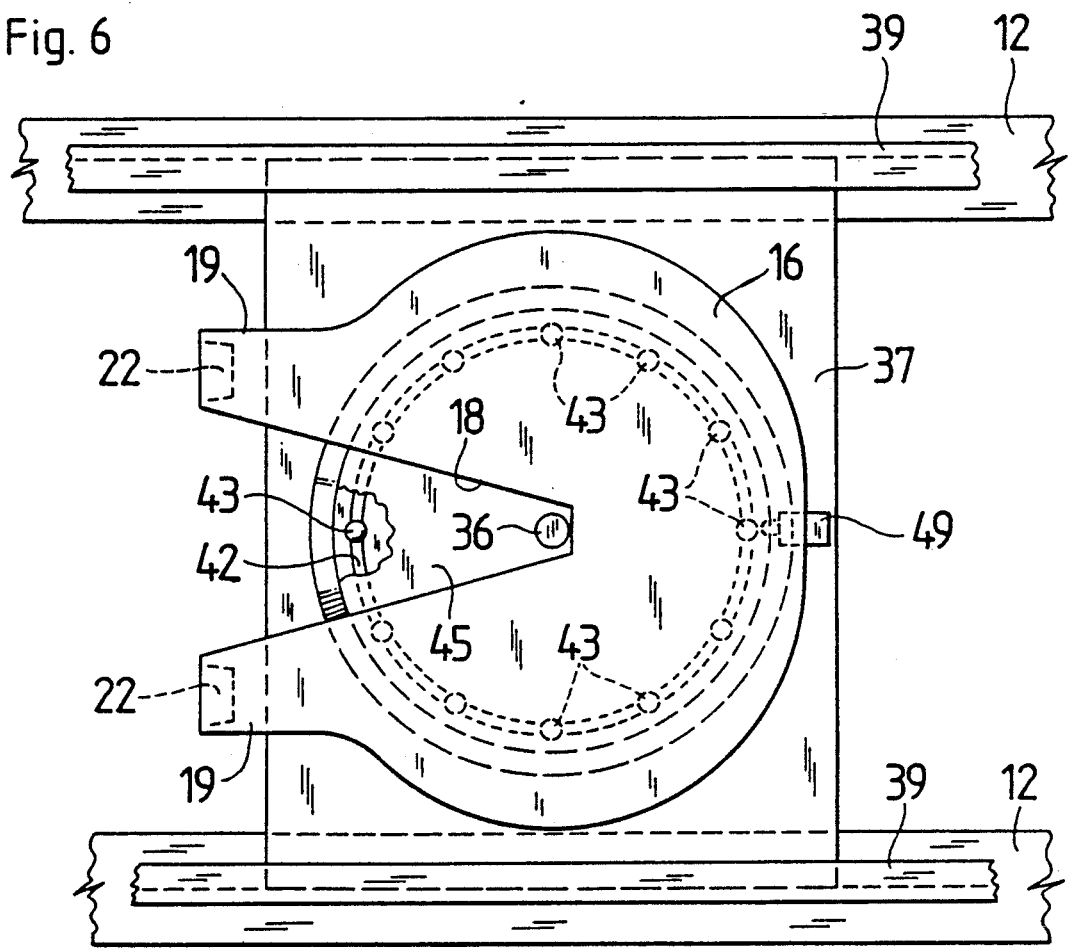
FIG. 6 is a plan view of the second embodiment.

In FIGS. 5 and 6 an alternative embodiment of the invention is shown. This embodiment, useful with a frameless trailer 41 utilizes a different bearing structure in that a lower race 42 is formed on the slide plate 37 and a plurality of roller bearings 43 are confined between the lower race 42 and an upper race 44 formed on the bottom of a deck plate support 45. The deck plate is then free to turn about a centerpin 46 vertically aligned beneath the kingpin. A pin 48 carried on an axis 49 and biased by a spring 51 may be provided to register the deck plate in its proper position when not connected to the trailer.

It should be understood that all of the bearings described hereinabove are preferentially greaseless bearings which need no replenishment of their lubricant. With such bearings in place it should be evident that I have devised a virtually maintenance free fifth wheel. Conventionally fifth wheels require frequent lubrication which eventually is eroded and winds up on the roadway. Accordingly my fifth wheel is not only mechanically, but also environmentally, superior to conventional fifth wheels.

While I have shown my invention in two forms, it will be obvious to those skilled in the art that it is not so limited but is susceptible of various changes and modifications without departing from the spirit thereof.

What I claim is:

1. A fifth wheel mounted to a tractor having a deck plate with a slot therein for receiving a kingpin of a trailer to be towed by said tractor in combination with a means for automatically connecting electrical and fluid lines between said trailer and tractor upon engagement of said kingpin within said fifth wheel comprising a pair of extension members integral with said deckplate and extending rearwardly therefrom on either side of said slot with at least one of said extension members terminating in a rearwardly opening receptacle for receiving therewithin a connective element affixed to said trailer rearwardly of said kingpin such that alignment of said kingpin within said slot and relative movement thereof to a locked position is concomitant with engagement of said connective element with said receptacle.

2. A fifth wheel as defined in claim 1 wherein said deck-plate is mounted for concomitant motion with said trailer such that no relative movement occurs between said connective element and said receptacle while they are engaged.

3. A fifth wheel as defined in claim 1 further comprises:
   a. a slide member selectively positionable longitudinally along the frame of said tractor; and
   b. a bearing member supporting said deck-plate on said slide member for pivotal motion about a vertical axis.

4. A fifth wheel mounted to a tractor having a deck plate with a slot therein for receiving a kingpin of a trailer to be towed by said tractor in combination with a means for automatically connecting electrical and fluid lines between said trailer and tractor upon engagement of said kingpin within said fifth wheel comprising a pair of extension members integral with said deckplate and extending rearwardly therefrom on either side of said slot with at least one of said extension members terminating in a rearwardly opening receptacle for receiving therewithin a connective element affixed to said trailer rearwardly of said kingpin such that alignment of said kingpin within said slot and relative movement thereof to a locked position is concomitant with engagement of said connective element with said receptacle, wherein said receptacle comprises an inclined surface extending inwardly from a rearmost point of said extension member to a female member of a connective element positioned to receive a male member of a connective element carried by said trailer.

5. Apparatus as defined in claim 4 wherein said connective elements are quick release fittings.

6. Apparatus as defined in claim 5 further comprises a housing affixed to said trailer about said male member having a forwardly opening recess for receiving said extension member therewithin.

7. A fifth wheel for receiving the kingpin of a trailer to be towed by a tractor within a tapered rearwardly opening guide slot in a deck plate comprising:
   a. means for mounting said fifth wheel for pivotal movement about a vertical axis; and
   b. means carried by said deck-plate for automatically connecting the hydraulic, pneumatic, or electrical system of said tractor with said trailer wherein said means for automatically connecting includes an extension formed in said deck plate collaterally of said guide slots forming a pair of engagement members, each engagement member having a truncating tapered shape and with at least one of said engagement members having a rearwardly opening receptacle for receiving connective members mounted on said trailer rearwardly of the kingpin thereof, with said receptacle comprising an inclined surface extending inwardly from a rearmost point of said engagement member to a female member of a connective element positioned to receive a male member of a connective element carried by said trailer.

8. Apparatus as defined in claim 7 wherein said connective elements are quick release fittings.

9. Apparatus as defined in claim 8 further comprises a housing affixed to said trailer about said male member having a forwardly opening recess for receiving said engagement member therewithin.

10. A fifth wheel as defined in claim 7 wherein said means for mounting comprises:
   a. a slide member selectively movable longitudinally above the frame of a tractor;
   b. a bearing centrally mounted on said slide member and supporting a stub shaft thereon for rotation about a vertical axis;
   c. a transverse member supported atop said stub shaft and extending perpendicularly thereto on either side thereof; and
   d. means connecting said deck plate to said transverse member for supporting said deck plate to said transverse member for supporting said deck plate for pivotal motion about the longitudinal axis of said transverse member.

11. A fifth wheel as defined in claim 10 wherein said means for supporting comprises a set of bearings supported on said transverse member to permit rotation about said longitudinal axis and a set of web-like members supporting said deck-plate on said bearings.

12. A fifth wheel as defined in claim 7 wherein means for mounting comprises:

a. a slide member selectively movable longitudinally above the frame of a truck; and
b. a bearing member supporting said deck-plate on said slide member for pivotal movement about a vertical axis.

13. A fifth wheel as defined in claim 12 wherein said bearing member comprises an annular race formed on the upper surface of said slide, a plurality of bearing elements positioned in said race and an upper race cooperatively formed beneath said deck-plate to receive and be supported on said bearing elements.

* * * * *